United States Patent
Yahagi et al.

(10) Patent No.: US 9,147,940 B2
(45) Date of Patent: Sep. 29, 2015

(54) CORNER REFLECTOR

(71) Applicant: IHI Aerospace Co., Ltd., Tokyo (JP)

(72) Inventors: Jun Yahagi, Tokyo (JP); Ryo Kaneko, Gunma (JP); Yoshiaki Shinoda, Tokyo (JP); Mitsuhiko Terashima, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 0 days.

(21) Appl. No.: 14/150,431

(22) Filed: Jan. 8, 2014

(65) Prior Publication Data

US 2014/0118178 A1    May 1, 2014

Related U.S. Application Data

(63) Continuation of application No. PCT/JP2012/061013, filed on Apr. 25, 2012.

(30) Foreign Application Priority Data

Jul. 8, 2011    (JP) ................................ 2011/151383

(51) Int. Cl.
*H01Q 15/20* (2006.01)
*H01Q 15/18* (2006.01)
(Continued)

(52) U.S. Cl.
CPC . *H01Q 15/20* (2013.01); *F41J 2/00* (2013.01); *F41J 9/08* (2013.01); *F42B 12/70* (2013.01); *G01S 7/38* (2013.01); *H01Q 15/18* (2013.01)

(58) Field of Classification Search
CPC ..... H01Q 15/14; H01Q 15/16; H01Q 15/161; H01Q 15/163; H01Q 15/18; H01Q 15/20; G01S 7/02; G01S 7/38; F41H 11/02; F41J 2/00; F41J 9/08; F41J 9/10; F42B 12/02; F42B 12/36; F42B 12/56; F42B 12/70; G02B 5/12; G02B 5/122; G02B 5/124
USPC ........ 342/1–11; 359/515, 529–534, 536, 538; 343/700 R, 907, 912–916
See application file for complete search history.

(56) References Cited

U.S. PATENT DOCUMENTS 2,778,010 A * 1/1957 Leonard ............................ 342/8
3,103,662 A 9/1963 Gray et al.
(Continued)

FOREIGN PATENT DOCUMENTS

CA    2 209 288 A1    5/1997
GB    758 090 A    9/1956
(Continued)

OTHER PUBLICATIONS

International Search Report issued in corresponding application No. PCT/JP2012/061013 completed Jul. 26, 2012 and mailed Aug. 7, 2012.
(Continued)

*Primary Examiner* — Bernarr Gregory
(74) *Attorney, Agent, or Firm* — Griffin & Szipl, P.C.

(57) ABSTRACT

A corner reflector includes: a radio wave reflection film having three reflection faces that are mutually orthogonal, and an unfolding device which unfolds the radio wave reflection film three-dimensionally. The corner reflector further includes: a canopy that unfolds concurrently with unfolding of the radio wave reflection film, and the canopy is connected to the unfolding device so as to partially overlie the radio wave reflection film.

4 Claims, 3 Drawing Sheets

(51) Int. Cl.
*F41J 2/00* (2006.01)
*F41J 9/08* (2006.01)
*F42B 12/70* (2006.01)
*G01S 7/38* (2006.01)
*H01Q 15/00* (2006.01)

(56) References Cited

U.S. PATENT DOCUMENTS

| | | | |
|---|---|---|---|
| 3,153,235 A * | 10/1964 | Chatelain | 342/8 |
| 3,217,325 A | 11/1965 | Mullin | |
| 3,224,001 A * | 12/1965 | Radnofsky et al. | 342/8 |
| 3,276,017 A | 9/1966 | Mullin | |
| 3,283,328 A | 11/1966 | Wood | |
| 3,671,965 A | 6/1972 | Rabenhorst et al. | |
| 4,673,934 A * | 6/1987 | Gentry et al. | 342/8 |
| 4,733,236 A | 3/1988 | Matosian | |
| 4,740,056 A * | 4/1988 | Bennett | 359/529 |
| 4,901,081 A * | 2/1990 | Bain et al. | 342/8 |
| 5,285,213 A * | 2/1994 | Tusch | 342/8 |
| 5,398,032 A * | 3/1995 | Tucker et al. | 342/9 |
| 5,920,294 A * | 7/1999 | Allen | 343/914 |
| 5,953,159 A * | 9/1999 | Shellans | 359/515 |
| 5,969,660 A * | 10/1999 | Veazey | 342/8 |
| 6,300,893 B1 | 10/2001 | Schaff et al. | |
| 6,384,764 B1 * | 5/2002 | Cumberland | 342/8 |
| 6,570,545 B1 * | 5/2003 | Snow et al. | 343/915 |
| 6,864,824 B2 * | 3/2005 | Garon et al. | 342/8 |
| 6,864,858 B1 * | 3/2005 | Miller et al. | 342/8 |
| 7,224,322 B1 * | 5/2007 | Ghaleb et al. | 342/8 |
| 2003/0137441 A1 | 7/2003 | Garon et al. | |

FOREIGN PATENT DOCUMENTS

| | | |
|---|---|---|
| GB | 812376 A | 4/1959 |
| GB | 2189079 A | 10/1987 |
| GB | 2 276 036 A | 9/1994 |
| JP | 53-47299 A | 4/1978 |
| JP | 04-355388 A | 12/1992 |
| JP | 09-190585 A | 7/1997 |
| JP | 2002-96795 A | 4/2002 |
| JP | 2011-127956 A | 6/2011 |
| WO | 2005/036941 A2 | 4/2005 |

OTHER PUBLICATIONS

International Search Report issued in co-pending application No. 14/150,336, completed Jul. 5, 2012 and mailed Jul. 17, 2012.
Office Action issued in co-pending related U.S. Appl. No. 14/150,336 on Feb. 10, 2015.
Supplementary European Search Report issued in corresponding application 12811123 on Feb. 6, 2015.
Supplementary European Search Report issued in related application 12810991 on Feb. 12, 2015.

* cited by examiner

CORNER REFLECTOR

This is a Continuation Application in the United States of International Patent Application No. PCT/JP2012/061013 filed Apr. 25, 2012, which claims priority on Japanese Patent Application No. 2011/151383, filed Jul. 8, 2011. The entire disclosures of the above patent applications are hereby incorporated by reference.

TECHNICAL FIELD

The present invention relates to a corner reflector to reflect radio waves and function as a decoy or the like.

BACKGROUND ART

Patent Literature 1, for example, describes a corner reflector. The corner reflector in Patent Literature 1 has the structure of FIG. 1. As in FIG. 1, the corner reflector includes eight sets of three mutually orthogonal radio wave reflection films 21. The thus configured corner reflector allows a radio wave incident thereon from any direction to be reflected in its incident direction.

For instance, as shown in FIG. 2, both of a radio wave A and a radio wave B can be reflected by the mutually orthogonal radio wave reflection films 21 in their incident directions.

A corner reflector is ejected from a flying object, a ship or the ground, and then unfolds in the air or on the water to be the shape of FIG. 1. To this end, the corner reflector, for example, has a balloon 23 as in the example of FIG. 1. This balloon 23 expands to be a spherical shape. The radio wave reflection films 21 are attached inside the balloon 23 so that the expansion of the balloon makes each radio wave reflection film 21 unfold as in FIG. 1. In the example of FIG. 1, a cylinder 25 provided supplies the inside of the balloon 23 with gas, whereby the balloon expands to be a spherical shape.

Such a configuration of the corner reflector, when it unfolds in the air, for example, and receives a radio wave from tracking radar or a radar seeker of a missile, reflects the radio wave in the incident direction as in FIG. 2. Thus, the corner reflector can be a decoy of the radar.

Other prior art documents of the present application include the following two patent literatures.

CITATION LIST

Patent Literature

PTL 1: Japanese Patent Publication Laid-open No. H04 (1992)-355388
PTL 2: Japanese Patent Publication Laid-open No. H09 (1997)-190585

SUMMARY OF INVENTION

Technical Problem

A corner reflector as described in these Patent Literatures has to be devised to lengthen the time of floating in the air so as to deceive the enemy for longer time.

To this end, a method of hanging a corer reflector from a parachute for descending as in FIG. 3A and a method of using a light-weighted corner reflector as in FIG. 3B have been used.

FIG. 3A shows a state after ejection of a flying object 3 by a warship 1 having a launch platform 2 until a parachute 5 and a corner reflector 4 unfold.

In this drawing, after the ejection of the parachute 5 and the corner reflector 4 from the flying object 3, the corner reflector 4 unfolds at appropriate timing.

FIG. 3B shows a light-weighted corner reflector so as to suppress descending speed using air resistance.

In this drawing, a corner reflector 6, after ejection and unfolding similarly to FIG. 3A, unfolds three-dimensionally. To this end, the corner reflector 6 has a radio wave reflection film 8 stretched across a supporting structure (shafts 7a, 7b and 7c) to return to the original shape. This configuration of the corner reflector enables the corner reflector 6 after unfolding to fall freely while suppressing descending speed using air resistance.

The parachute used can suppress speed but has a problem of increasing the volume of the corner reflector to store the parachute or may fail to unfold properly due to entangled hanging rope.

In the case of free falling, since the radio wave reflection face is flat, it is difficult to suppress speed sufficiently.

It is an object of the present invention to provide a corner reflector that can suppress descending speed while achieving a simple structure.

Solution to Problem

In order to fulfill the object, the present invention provides a corner reflector including: a radio wave reflection film having three reflection faces that are mutually orthogonal, and an unfolding device which unfolds the radio wave reflection film three-dimensionally. The corner reflector includes: a canopy that unfolds concurrently with unfolding of the radio wave reflection film, and the canopy is connected to the unfolding device so as to partially overlie the radio wave reflection film.

According to one embodiment of the present invention, the unfolding device is a hollow balloon that expands while unfolding, the hollow balloon is an annular hollow balloon having flexibility and airtightness, and when gas is supplied therein, the hollow balloon expands with pressure of the gas to be an annular shape, and the corner reflector further includes a gas supplying device that injects gas into the hollow balloon.

The gas supplying device may be connected to the hollow balloon near an intersection of a perpendicular line extending in a falling direction from a barycenter of the hollow balloon and the canopy with a surface of the hollow balloon, and the gas supplying device may function as a weight to stabilize falling posture of the corner reflector after the hollow balloon expands.

According to another embodiment, the unfolding device is a device made of shape-memory alloy or wire.

Advantageous Effects of Invention

The present invention can suppress the descending speed of the corner reflector because of the canopy that is directly attached to the corner reflector, and can avoid a failure in proper unfolding of the corner reflector due to entangled hanging rope because it does not have hanging rope.

Further, the gas cylinder disposed at an appropriate position can stabilize the falling posture of the corner reflector.

DESCRIPTION OF EMBODIMENTS

Figure 1:
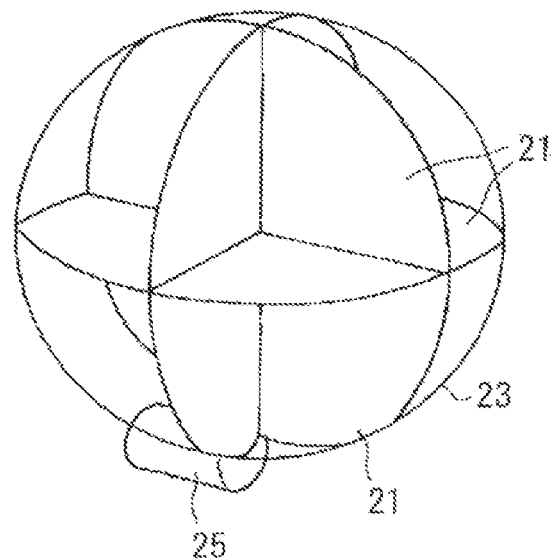
FIG. 1 shows the structure of a corner reflector of Patent Literature 1.
Figure 2:
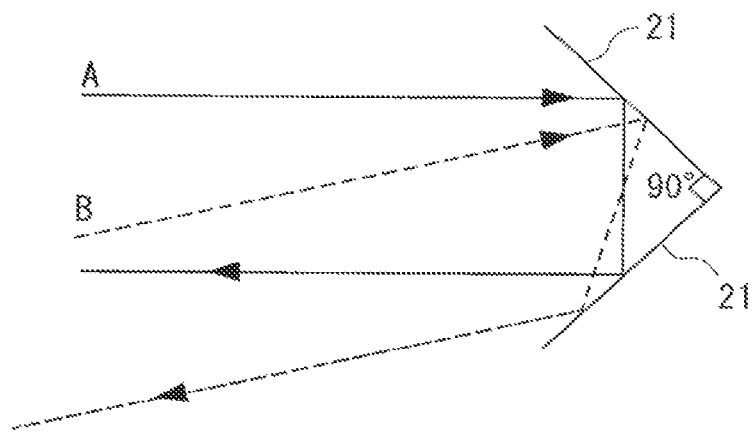
FIG. 2 describes the action of a corner reflector.
Figure 3A:
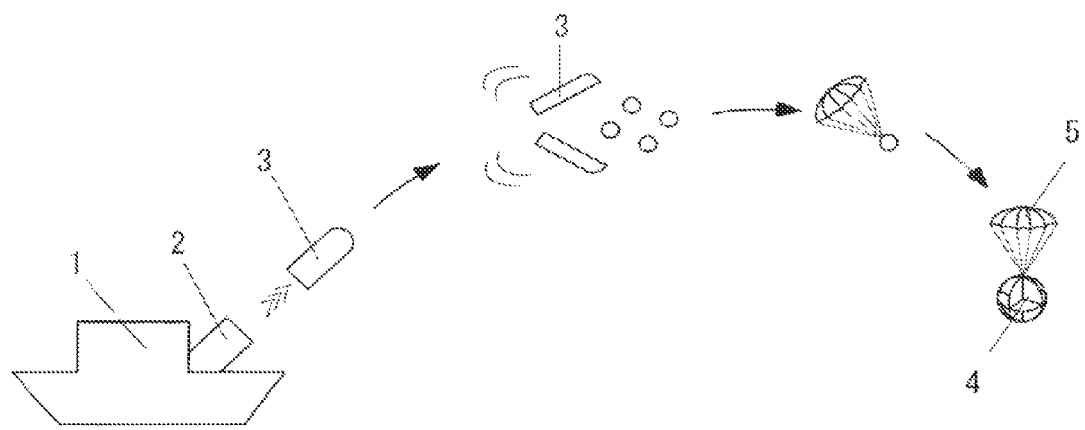
FIG. 3A shows a conventional corner reflector hung from a parachute.
Figure 3B:
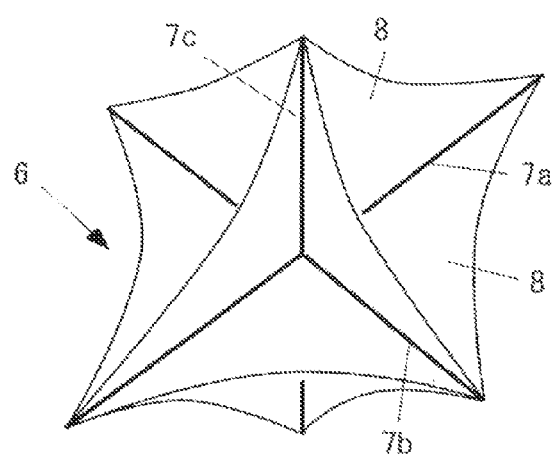
FIG. 3B shows a conventional light-weighted corner reflector.

The following describes preferable embodiments of the present invention, with reference to the drawings, in which like reference numerals designate like parts to avoid the duplicate description.

Figure 4:
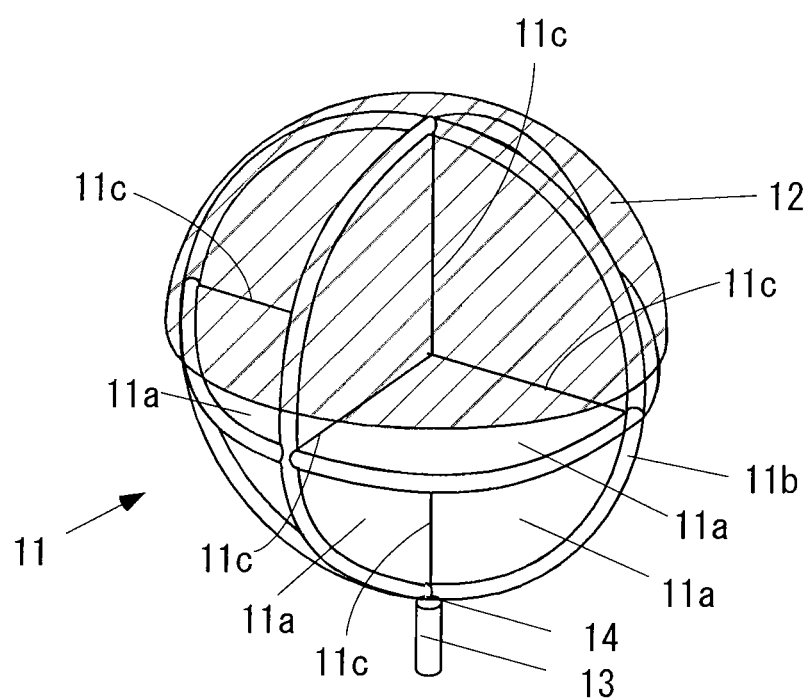
FIG. 4 is a perspective view of a corner reflector of the present invention.

FIG. 4 is a perspective view of a corner reflector of the present invention.

In this drawing, a corner reflector 11 of the present invention includes a radio wave reflection film 11a having mutually orthogonal three reflection faces, and an unfolding device 11b which unfolds the radio wave reflection film 11a three-dimensionally.

The corner reflector 11 of the present invention further includes a canopy 12 that unfolds concurrently with the unfolding of the radio wave reflection film 11a. The canopy 12 is connected to the unfolding device 11b so as to partially overlie the radio wave reflection film 11a.

The unfolding device 11b in this example is a hollow balloon that expands while unfolding.

Herein the unfolding device 11b is not limited to a hollow balloon, and may be a device made of shape-memory alloy or wire for unfolding by releasing the folding state.

The radio wave reflection film 11a in this example is made of conductive fiber.

The conductive fiber may be nylon or polyester fiber coated with a metal film (copper, silver or the like), for example.

In this example, the radio wave reflection film 11a includes twelve fan-shaped (having the central angle of 90°) films, and is configured so that their planes are mutually orthogonal in the expansion state. This configuration means eight sets in total of reflection regions, each set including three radio wave reflection films 11a, provided when the hollow balloon 11b expands.

In FIG. 4, lines 11c are joint parts of the plurality of radio wave reflection films 11a.

In a preferable design, when the hollow balloon 11b expands, the outer edge of each radio wave reflection film 11a is in close contact with the hollow balloon 11b.

The hollow balloon lib expands with gas pressure so as to make the radio wave reflection films unfold.

The hollow balloon 11b in this example is an annular hollow balloon having flexibility and airtightness, and when gas is supplied therein, it expands with the gas pressure to be an annular shape.

Such an annular hollow balloon lib enables unfolding of the corner reflector 11 with a very small amount of gas compared with a spherical balloon, for example. This leads to an advantage of shortening time required for unfolding of the corner reflector 11.

The hollow balloon 11b may be made of a plastic film such as polyolefin, nylon or polyvinyl chloride.

Preferably an outer periphery of the hollow balloon 11b is surrounded with binding fiber to prevent expansion of the hollow balloon 11b beyond predetermined limit volume.

The canopy 12 in this example has a hemispherical shape in the unfolding state, and is connected to the outer wall of the hollow balloon 11b so as to unfold with the expansion of the hollow balloon 11b.

When the hollow balloon 11b is not spherical, the canopy 12 may have a shape along the outer wall of such a hollow balloon 11b.

The canopy 12 does not have hanging rope that is used for a conventional parachute, and so can remove the risk of failure in unfolding due to entangled hanging rope.

The canopy 12 can be opened forcibly and quickly when the hollow balloon 11b expands.

The canopy 12 is made of cloth that is thin and light-weighted, and so has an advantage of suppressing the volume to storage therefor.

The canopy 12 is made of nylon, for example, that is used for a conventional parachute.

In response to the ejection of the corner reflector 11 from a flying object launched from a warship or the like, a gas supplying device 13 injects gas into the hollow balloon 11b for expansion while unfolding the canopy 12.

The gas supplying device 13 in this example is a gas cylinder, and is connected to the hollow balloon 11b at a connecting part 14 that is near the intersection of a perpendicular line extending in the falling direction from the barycenter of the hollow balloon 11b and the canopy 12 when the hollow balloon 11b expands and the canopy 12 unfolds with the surface of the hollow balloon 11b.

Since the gas cylinder 13 is connected at such a position, the gas cylinder 13 can function as a weight to stabilize the posture of the corner reflector 11 after the injection of gas as well.

Gas from the gas cylinder 13 may be branched off or a plurality of gas cylinders may be used for injection of gas from any and a plurality of parts of the balloon via a hose so as to expand the balloon quickly.

The gas supplying device 13 is not limited to a gas cylinder, and gas may be generated by gas-forming agent, and the hollow balloon lib may expand with such gas.

In this example, the gas cylinder 13 injects gas in response to the ejection of the corner reflector 11 from a flying object. Instead, the injection of gas may be started after the elapse of a certain period of time since the ejection from the flying object or may be started by remote operation.

The gas supplying device (not illustrated) may be a gas cylinder, a gas generator using pyrotechnic or the like, and may operate so as to supply gas into the hollow balloon 11b at predetermined timing.

The present invention is not limited to such an embodiment, and it may be modified in various ways without departing from the scope and spirit of the invention.

The corner reflector 11 of the present invention may be used for purposes other than a decoy. For instance, the corner reflector 11 of the present invention may be used to notice where the missing person is as in Patent Literature 2.

The canopy 12 of the present invention may be used for balloons other than a hollow balloon (e.g., spherical balloon). In the case of a spherical balloon, a radio reflection film 8 may be internally attached to the balloon.

REFERENCE SIGNS LIST

1: warship, 2: launch platform, 3: flying object, 4: corner reflector, 5: parachute, 6: corner reflector, 7a to 7c: shaft, 8: radio wave reflection film, 11: corner reflector, 11a: radio wave reflection film, 11b: unfolding device (hollow balloon, annular hollow balloon), 11c: joint part, 12: canopy, 13: gas supplying device (gas cylinder), 14: connecting part, 21: radio wave reflection film, 23: balloon, 25: cylinder

The invention claimed is:

1. A corner reflector including a radio wave reflection film having three reflection faces that are mutually orthogonal, and an unfolding device which unfolds the radio wave reflection film three-dimensionally, comprising:
   a canopy that unfolds concurrently with unfolding of the radio wave reflection film;
   wherein
   the unfolding device is a hollow balloon that expands while unfolding the radio wave reflection film, and
   the canopy in the unfolding state has a hemispherical shape along an outer wall of the hollow balloon and is connected to the unfolding device so as to partially overlie the radio wave reflection film.

2. The corner reflector according to claim 1, wherein the hollow balloon is an annular hollow balloon having flexibility and airtightness, and when gas is supplied therein, the hollow balloon expands with pressure of the gas to be an annular shape, and
   the corner reflector further includes a gas supplying device that injects gas into the hollow balloon.

3. The corner reflector according to claim 2, wherein the gas supplying device is connected to the hollow balloon near an intersection of a perpendicular line extending in a falling direction from a barycenter of the hollow balloon and the canopy with a surface of the hollow balloon, and
   the gas supplying device functions as a weight to stabilize falling posture of the corner reflector after the hollow balloon expands.

4. The corner reflector according to claim 1, wherein the unfolding device is a device made of shape-memory alloy or wire for unfolding by releasing a folding state.

* * * * *